United States Patent [19]
Martiros

[11] 3,815,294
[45] June 11, 1974

[54] METHOD FOR MAKING ONE-PIECE MULTIFOCAL LENSES

[75] Inventor: Paul Martiros, Cherry Valley, Mass.

[73] Assignee: American Optical Corporation, Southbridge, Mass.

[22] Filed: June 26, 1972

[21] Appl. No.: 266,189

[52] U.S. Cl. ................................................ 51/284
[51] Int. Cl. ............................................ B24b 1/00
[58] Field of Search ........................... 51/277, 284

[56] References Cited
UNITED STATES PATENTS

| | | | |
|---|---|---|---|
| 2,944,166 | 8/1961 | Bardwell et al. | 51/284 |
| 2,966,767 | 1/1961 | Kress | 51/284 |
| 3,066,458 | 12/1962 | Catron et al. | 51/284 |
| 3,339,318 | 9/1967 | Graf et al. | 51/284 |
| 3,618,271 | 11/1971 | Martiros | 51/277 |

*Primary Examiner*—Harold D. Whitehead
*Attorney, Agent, or Firm*—H. R. Berkenstock, Jr.; William C. Nealon

[57] ABSTRACT

Complete processing of one-piece multifocal lens blanks with a single lens blocking operation. A molded or cast meniscus blank of lens material is provided with a plurality of optically finished, differently curved focal fields using a single carrier upon which the blank is initially blocked. The single carrier supports the blank during all operations of forming and finishing the focal fields which are separated from one another by a straight cliff-like line of division extending completely across the blank.

5 Claims, 9 Drawing Figures

METHOD FOR MAKING ONE-PIECE MULTIFOCAL LENSES

BACKGROUND OF THE INVENTION

1. Field of the Invention:

Lens manufacturing method and apparatus with particular reference to the making of one-piece multifocal lens blanks each having a straight cliff-like line of division between their adjoining focal fields.

2. Description of the Prior Art:

In the manufacture of one-piece multifocal lens blanks having straight cliff-like lines of division between adjoining focal fields, difficulties are encountered in achieving minimum height and cleanly cut cliff edges between the focal fields, precision in alignment of centers of curvatures of the fields and accuracy of field curvature in each case.

While various prior art methods and apparatuses have, of late, relieved manufacturers of some of the aforementioned difficulties, multiple lens blocking operations of these prior art techniques are attended by the problem of blocking errors accumulating to the extent of incurring uneconomical scrap yields. Multiple lens blocking operations in lens processing cycles are also time consuming to perform and uneconomical.

With the foregoing in view, the present invention deals with simplification of one-piece multifocal lens blank manufacturing procedures and the advantages thereof including increased accuracy in focal field curvatures location, height and sharpness of cliff-like lines of division between focal fields and consistency of finished lens blank center thickness.

SUMMARY OF THE INVENTION

The foregoing and corolary objectives of the present invention are accomplished with method for carrying out all operations required in the grinding and polishing of multifocal one-piece lens blanks with a single operation of blocking the lens blank in each case upon a carrier which, in turn, carries the blank from start to finish without deblocking. In this latter respect, the method of this invention uniquely adapts the lens blank to conventional surface grinding and polishing apparatuses employing tried and true techniques of tooling and operation.

The invention will be more fully understood by reference to the following detailed description when taken in conjunction with the accompanying drawing.

DESCRIPTION OF THE PREFERRED EMBODIMENTS

Figure 1:
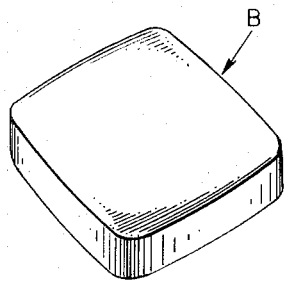
FIG. 1 is a perspective view of a molded or cast meniscus blank which is typical of a type used in the manufacture of one-piece multifocal lens blanks according to the present invention.
Figure 2:
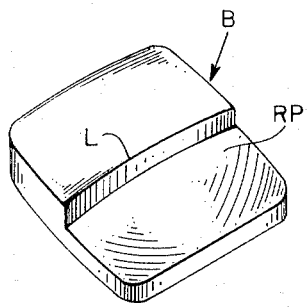
FIG. 2 is an illustration, in perspective, of a partially finished one-piece multifocal lens blank.
Figure 3:
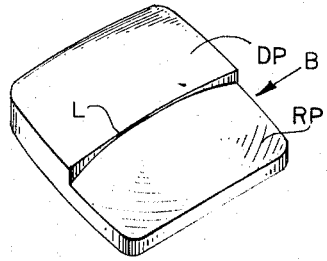
FIG. 3 is a similar perspective illustration of a finished one-piece multifocal lens blank.

Referring more particularly to FIGS. 1-3, there is illustrated the usual three stages involved in producing onepiece straight line bifocal lens blanks which, as described in U.S. Pat. No. 3,618,271 for example, each have a distance focal field or distance portion DP and a reading focal field or reading portion RP separated from one another by a straight cliff-like line of division L of minimum practical height (e.g., 0.1mm) at center C, FIG. 3. The blank B, initially in the form of a cast or molded piece of lens material such as glass or plastic as shown in FIG. 1, is first ground and polished over a substantial portion of its convex side to a focal field curvature corresponding to that desired of reading portion RP as shown in FIG. 2. In so doing, sufficient material is removed from the convex side of the blank to form the cliff-like line of division L of sufficient height to allow for grinding and polishing of the distance portion DP of FIG. 3.

It should be understood that, while not shown in the present drawing, the process of this invention is applicable to the manufacture of trifocal blanks as well. In processing trifocal lens blanks, a third focal field is simply formed between the RP and DP of blank B. Still another form of one-piece multifocal lens blank may include two reading portions, one above and one below the distance portion DP with a cliff-like line of division of the type shown in FIG. 3 along upper and lower edges of the distance portion. The forming of trifocal lens blanks or others having more than two focal fields are merely extensions of the process used to form bifocal lens blanks. Thus, the making of bifocal blanks only will be described herein, it being understood that the making of other multifocal blanks involves the practice of additional but identical method steps and apparatuses.

In forming a lens blank of the type depicted in FIG. 3 with a single blocking operation according to the present invention, an unfinished cast or molded blank B of lens material, e.g. of the type illustrated in FIG. 1, is placed in blocking fixture 10 (FIG. 4) against holder 12. Blank B is centered relative to axis A—A of holder 10 by inner side walls 14 and pulled tightly against seat 16 of holder 12 by suction produced internally of the holder with vacuum line 18. The vacuum may be dispensed with if desired.

Figure 4:
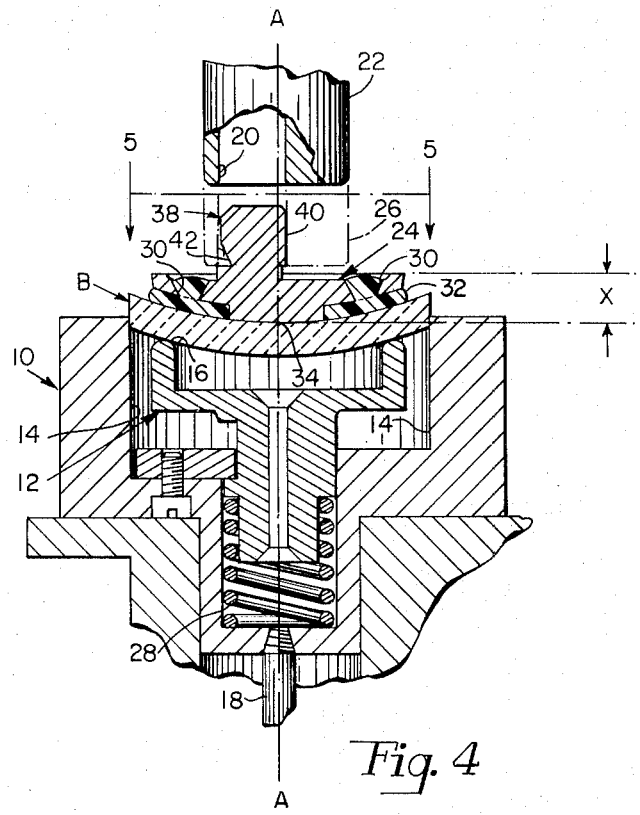
FIG. 4 is a vertical cross-sectional fragmentary view of apparatus used for blocking a lens blank upon a carrier for processing thereof according to the present invention.

Adapter 20 of blocking spindle 22 receives lens blank carrier 24 and fixes the carrier in a coaxially aligned relationship with axis A—A of fixture 10. When in its lower position as indicated by dot-dash outline 26, spindle 22 brings carrier 24 into direct contact with lens blank B in centered relationship therewith. With carrier 24 so located against lens blank B and further with a slight downwardly directed holding force applied thereto by spindle 22 against the tension of spring 28, an adhesive blocking medium such as pitch or a low melting temperature alloy 32 is poured through one or more openings 30 in carrier 24 to completely fill the space between the lens blank and carrier around the referencing portion 34 of the carrier as shown in FIG. 4. This adhesively secures lens blank B to carrier 24 and completes the one and only blocking operation, per lens, which is used to carry out all focal field grinding and polishing operations according to the present inventive concept.

After blocking, spindle 22 is raised to the position shown by full lines in FIG. 4 with the carrier 24 held in fixture 10 for disengagement. The carrier 24 may, alternatively, be raised with spindle 24 and then pulled downwardly outwardly therefrom. In any case, carrier 24 is ultimately removed from spindle 22 and fixture 10.

Figure 5:
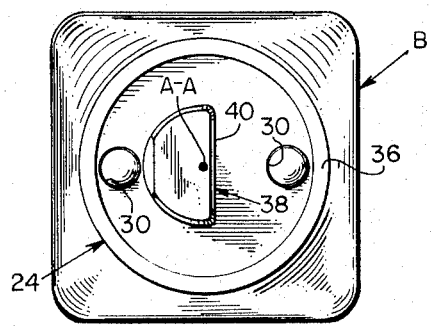
FIG. 5 is an illustration of the lens blank and carrier combination, after blocking, as viewed from line 5—5 of FIG. 4.

Referring more particularly to details of carrier 24, it can be seen with reference to FIGS. 4 and 5, that, in addition to having the lens blank referencing portion 34 against which the lens blank inner surface becomes seated, carrier 24 has a ground and finished annular rim 36 disposed parallel to a tangent of the centermost point of referencing portion 34. Rim 36 is located at a predetermined fixed distance X from the center of referencing portion 34.

Shank 38 of carrier 24 is used to adapt the carrier and its attached lens blank to apparatus for grinding and polishing multifocal surfaces upon the blank as will be described in detail hereinafter. It has a flat side 40 oriented to extend in the direction which cliff-like line of division L is intended to be formed across lens blank B. Oppositely of side 40, shank 38 has notch 42 which is tapered downwardly and inwardly for engagement by spring detent means also to be described in greater detail hereinafter. The spring detent fixedly holds flat side 40 of shank 38 constantly against a reference surface of receiving adapters used in lens blank grinding and polishing apparatus. This establishes identical positioning of the lens blank cliff-like line of division relative to focal field grinding and polishing tools in and during all grinding and polishing operations which require sequential application, removal and reapplication of the carrier to various pieces of apparatus.

Figure 6:
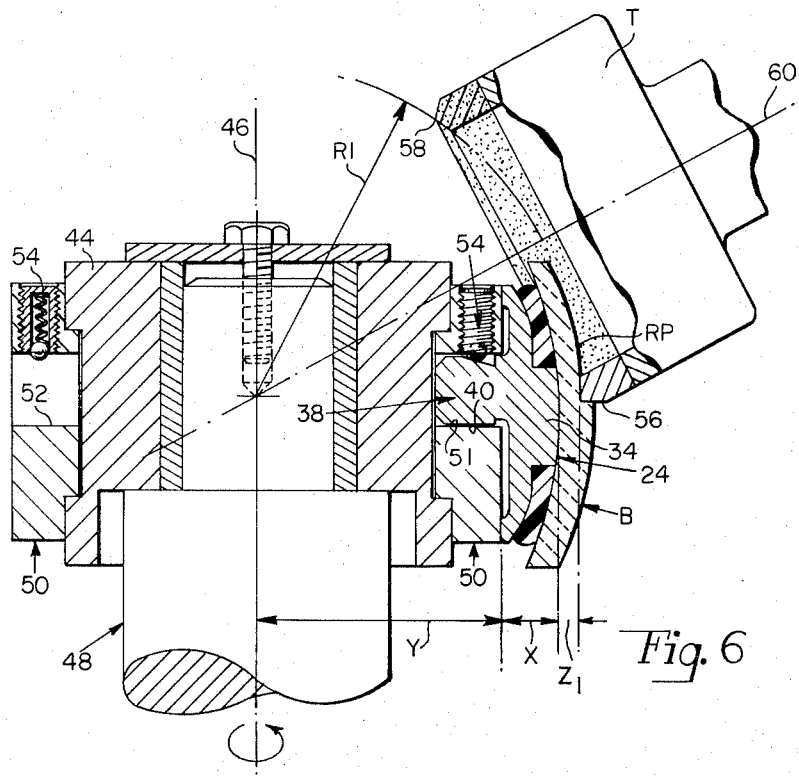
FIG. 6 is a vertical fragmentary cross-sectional view of apparatus used according to the present invention in grinding one focal field upon a blocked lens blank.

A first step in the processing of lens blank L is the grinding of its RP surface utilizing apparatus and method of the type depicted in FIG. 6.

Figure 7:
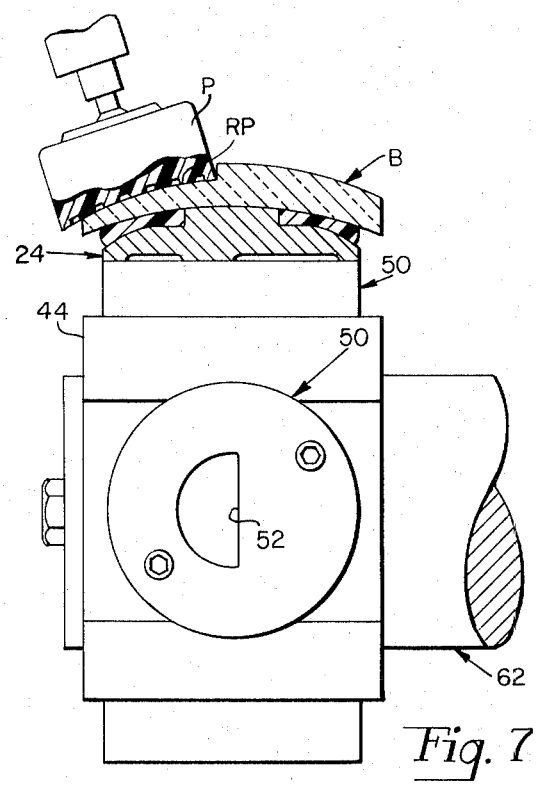
FIG. 7 is a partially cross-sectioned elevational view of apparatus used for polishing lens blank surfaces according to this invention.

Referring more particularly to FIG. 6, it can be seen that carrier 24 is adapted to wheel block 44 which is supported and rotated about its axis 46 by spindle 48. Wheel block 44 is provided with a plurality of adapters 50 located about its outer periphery, each of which is intended to detachably receive a carrier 24. Only one adapter 50 is shown as being used in FIG. 6 so that constructional details of adapters 50 can be readily discerned from the unused adapter. Each adapter 50 has opening 52 extending thereinto. Opening 52 is of a shape corresponding to that of shank 38 of carrier 24 as can best be seen by comparing FIG. 5 with FIG. 7. FIG. 7 depicts an adapter 50 in plan view. With shank 38 of carrier 24 keyed into opening 52 of adapter 50, lens blank B is automatically centered upon wheel block 44 and fixed against rotational misorientation. Spring loaded detent 54 in adapter 50 hold flat side 40 of carrier 24 fixedly against the correspondingly shaped side of opening 52 thereby locating the line indicated by point 56 in FIG. 6. This line extends across lens blank B at the location where cutting edge 58 of tool T forms the cliff-like edge L (FIG. 2) of blank B. Cutting edge 58 of tool T is preferably diamond charged.

With distance X (FIG. 6) having been established by blocking lens blank B directly against reference portion 34 of carrier 24, and distance Y from axis 46 of wheel block 44 to rim 36 of carrier 24 and/or the outermost face of adapter 50 mechanically controlled and further knowing the ultimate center thickness $Z_1$ desired of grinding edge 58 of tool T which is located at a radial distance R from blank B, adapting blank B to wheel block 44 with carrier 24 and adapter 50 automatically causes the sum of distances X, Y and $Z_1$ to establish proper positioning of blank B relative to tool T for the generating of its RP surface.

Tool T is shown as being located at a final depth of cut position relative to lens blank B in FIG. 6, thus having its grinding edge 58 at radial distance $R_1$ from axis of rotation 46 of wheel block 44 equal to the radius of curvature desired of the blank RP. Grinding of the RP of lens blank B may be accomplished either with tool T fixed at radial distance $R_1$ and rotation of wheel block 44 or by gradually moving tool T from a retracted position along its axis 60 toward lens blank B to the final depth of cut position shown in FIG. 6 along with rotation of wheel block 44. The former is commonly referred to as milling and the latter as generating. In either case, tool T would be continuously rotated about its axis while wheel block 44 is rotated about its axis 46.

Those interested in greater details of lens blank surface generating or milling may refer to one or more of U.S. Pat. Nos. 2,890,551; 2,932,925; 2,966,767; 2,994,166; 3,618,721.

Having completed the above-described grinding of the RP, the RP surface is optically polished, e.g., as shown in FIG. 7. Although polishing may be performed upon the grinding machine spindle 48 of FIG. 6 with substitution of a polishing tool for grinding tool T, it is preferable to remove wheel block 44 from spindle 48 and remount the same along with carrier 24 and lens blank B upon a polishing machine spindle 62 as diagrammatically illustrated in FIG. 7. As is the case in many conventional lens polishing apparatuses, spindle 62 is disposed horizontally whereby wheel block 44 becomes disposed vertically for rotation by spindle 62 about the spindle axis. Polishing tool P having a plastic, felt or other conventional poloshing surface 64 preshaped to the curvature of the lens blank RP, or adapted to readily conform thereto, is brought into engagement with the ground RP surface substantially as illustrated in FIG. 7. Polishing of the RP of lens blank B is then effected by application of a polishing compound such as rouge and rotation of wheel block 44 with or without lateral oscillation of polishing tool P. Greater details of this particular type of lens polishing operation may be had by reference to the previously listed U.S. Pats.

Polishing of the RP completes the stage of lens blank processing which is illustrated by FIG. 2.

Figure 8:
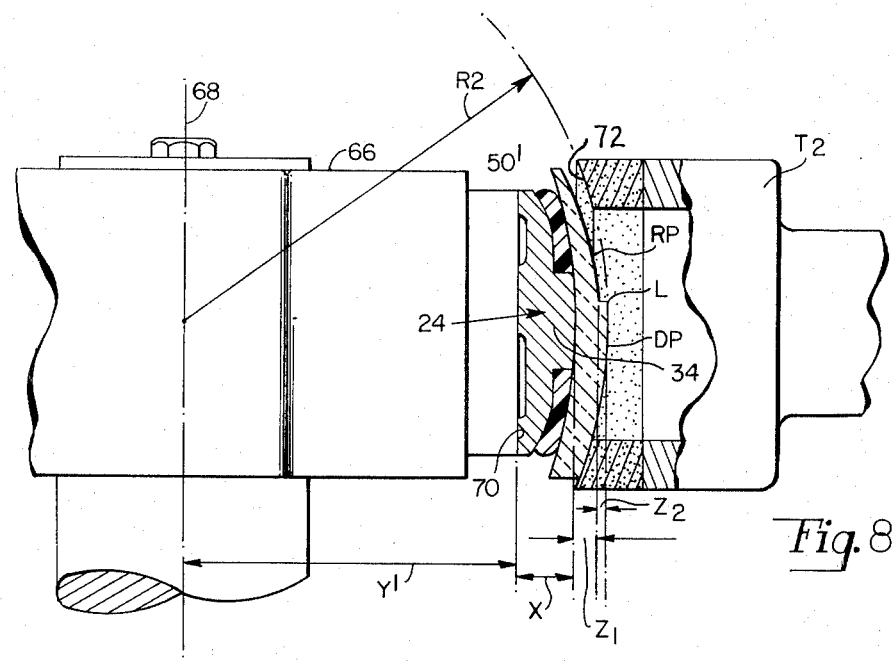
FIG. 8 is a partially cross-sectioned elevational view of apparatus for grinding different focal fields upon the lens blanks.

Carrier 24 with attached blank B is next pulled out of adapter 50 of wheel block 44 and snapped into a similar adapter 50' carried by wheel block 66 of FIG. 8 for grinding of the DP. Wheel block 66 is substantially identical to wheel block 44 with only the difference of its larger diametral size or dimension from axis 68 to front face 70 of adapter 50'. This radial distance Y' added to the already described distance X, plus distance $Z_1$ to the center of the RP plus a minimal thickness $Z_2$ of, for example, 0.1mm of desired cliff edge L of blank B locates the unfinished portion of lens blank B at a radius $R_2$ from the axis of rotation 68 of wheel block 66. $R_2$ equals the radius of curvature desired of the DP. With the grinding edge of face 72 of tool $T_2$ located at the radial distance $R_2$ from axis 68, rotation of wheel block 66 causes a milling of the DP portion of lens blank B to its desired final curvature and depth of cut.

From the foregoing it can be seen that by proper control of radial distance Y' of wheel block 66 and without deblocking and reblocking of blank B, grinding of its distance portion is greatly simplified and prior art blocking error problems are obviated.

It is to be understood that the results of the milling operation, e.g., rotation of lens blank B over the grinding face 72 of tool $T_2$, may be similarly accomplished with a generating operation wherewith, from a retracted position, tool $T_2$ is moved along its axis into engagement with lens blank B until it reaches a point where grinding edge 72 becomes coincident with the imaginary radius of curvature described by arrow $R_2$.

The DP surface may be optically polished in a manner similar to that shown and described with reference to FIG. 7 which concerns polishing of the RP. In the case of DP polishing, it would only be necessary to remove wheel block 66 from the spindle shown by FIG. 8, place the block 66 upon spindle 62, position polishing tool P or a similar tool having its face 64 preformed to the DP curvature upon the DP surface and effect the rotation of spindle 62 with or without lateral oscillation of polishing tool P.

Upon completion of such polishing of the DP, lens blank B has reached the finished stage of processing which is represented by FIG. 3 of the drawings. It is next deblocked, i.e., removed from carrier 24, cleaned and packaged for marketing.

Figure 9:
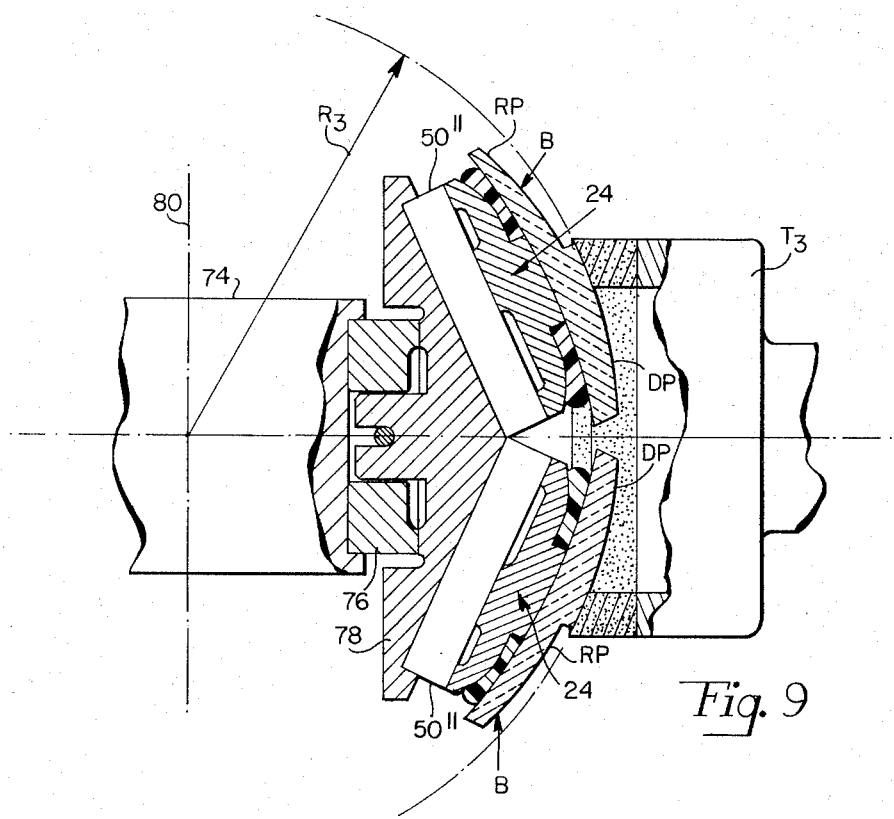
FIG. 9 is a partially cross-sectioned elevational view of a modification of this invention.

A modification of the invention is shown in FIG. 9 wherein a double row adaptation of lens blanks B to a single wheel block 74 is illustrated. In this case, a master adapter 76 fitted to wheel block 74 receives a master carrier 78 having dual adapters 50'' each identical to the already described adapters 50 and 50'. Adapters 50'' each, in turn, receive a carrier 24 having a semifinished lens blank B previously blocked thereon and having its RP surface finished. Adapters 50'' and carriers 24 are disposed in oppositely directed rotational orientation whereby distance portions DP of the lens blanks B are brought into side-by-side relationship with each other essentially as illustrated. Thus, with tool $T_3$ of a diametral size sufficiently large to span the entire transverse dimension of the side-by-side pair of lens blank DP portions, as shown, rotation of block 74 about its axis 80 effects the grinding of the DP portions of lens blanks B to desired finished curvature and depth of cut in the manner already described with respect to the single lens operation of FIG. 8. Similar milling operations are shown and described in one or more of the above-listed U.S. Pats., especially U.S. Pat. Nos. 2,966,767; 2,994,166 and/or 3,618,271. In the case of the FIG. 9 embodiment of this invention, physical dimensions of adapters 50', master carrier 78, master adapter 76 and wheel block 74 are controlled to locate the final depth of cut position of the grinding face of tool $T_3$ at radial distance $R_3$ from axis 80 as illustrated.

From the foregoing description of this invention, it can be seen that all operations described relative to the finishing of one-piece multifocal lens blanks from the case or molded stage of FIG. 1, to and completed final stage illustrated in FIG. 3, are performed with only a single lens blocking operation. That is to say, each lens blank is aligned and blocked upon a carrier 24 which automatically adapts the blank to the plurality of apparatuses necessary in processing finished RP and DP portions of the blank. Prior art requirements for deblocking and reblocking between operations of forming RP and DP are completely obviated. This not only renders any and all inaccuracies of alignment of lens blanks during blocking inconsequential to the end result but also very importantly relieves the manufacturer of prior art problems of error accumulation in plural grinding, blocking, deblocking, re-aligning and reblocking operations by eliminating the latter operations, their costliness in time and effort to perform and apparatuses required for such performance.

I claim:

1. The method of grinding and polishing the convex sides of one-piece multifocal lens blanks comprising the steps of:

attaching the concave side of each blank to a single lens blank carrier with said concave side of the blank being a reference surface thereof and placed in direct contact with a referencing portion of the carrier which portion is located at a predetermined axial distance from an established mounting surface of said carrier the latter being used for adapting said carrier to lens blank grinding and polishing apparatus;

mounting said carrier and attached lens blank in first lens grinding apparatus for revolving the lens blank about a radius of curvature extending from an axis of revolution a distance equal to that desired along one meridian of a first portion of the convex surface of the blank, said mounting surface of said carrier being located at a distance from said axis of revolution equal to said radius of curvature minus said axial distance from said mounting surface to said reference portion of said carrier;

revolving said lens blank about said radius of curvature and grinding said first portion thereof to said radius of curvature;

removing said carrier from said first lens grinding apparatus;

remounting said same lens carrier and attached lens in first lens polishing apparatus and polishing said first portion of said lens blank;

removing said carrier from said first polishing apparatus;

remounting said same carrier and attached lens in second lens grinding apparatus for revolving the lens blank about a second radius of curvature extending from the axis of revolution a distance equal to that desired along one meridian of a second portion of the blank, said mounting surface located at a distance from said axis of revolution equal to said second radius of curvature minus said distance from said mounting surface to said reference portion of said carrier;

revolving said lens blank about said second radius of curvature and grinding said second portion thereof to said second radius of curvature;

removing said carrier from said second lens grinding apparatus;

remounting said same carrier and attached lens blank in second lens polishing apparatus;

polishing said second portion of said lens blank;

removing said carrier from said second lens polishing apparatus; and detaching said lens blank from said carrier.

2. The method according to claim 1 wherein a plurality of said carriers and attached lens blanks are mounted on a single master carrier and said master carrier is mounted and remounted in said first and second lens grinding and first and second lens polishing apparatuses for conducting said lens grinding and lens polishing operations of said method.

3. The method according to claim 2 wherein said carriers are individually removed from said master carrier and remounted in at least one of said grinding and polishing apparatuses.

4. The method according to claim 2 wherein said carriers are mounted in said master carrier following said grinding in said first grinding apparatus and said master carrier is mounted in at least one of the remaining polishing and grinding apparatuses.

5. The method according to claim 2 wherein said master carrier supports a plurality of said single lens blank carriers with single lenses respectively attached to said single carriers.

* * * * *